Oct. 19, 1971    W. D. FINNEGAN    3,613,220
METHOD OF FORMING TRANSITION INSERT MATERIAL
Filed Nov. 25, 1969    2 Sheets-Sheet 1
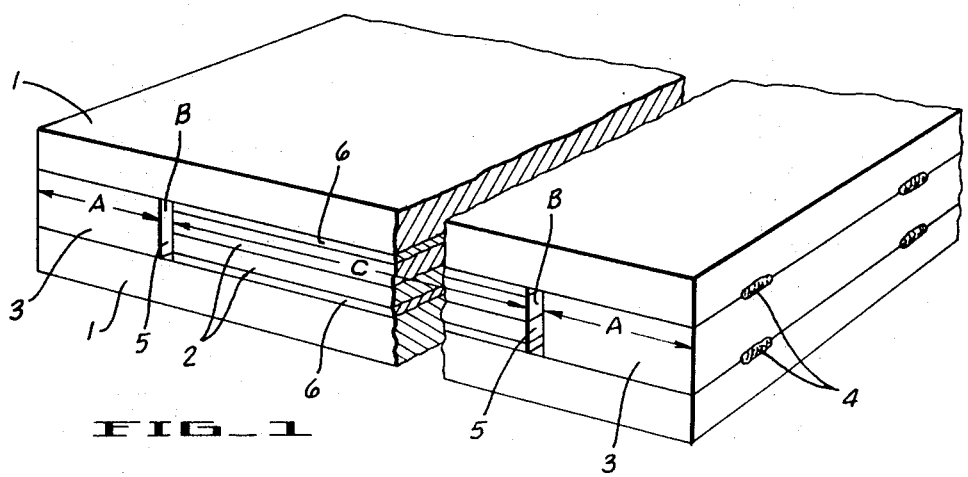
FIG_1
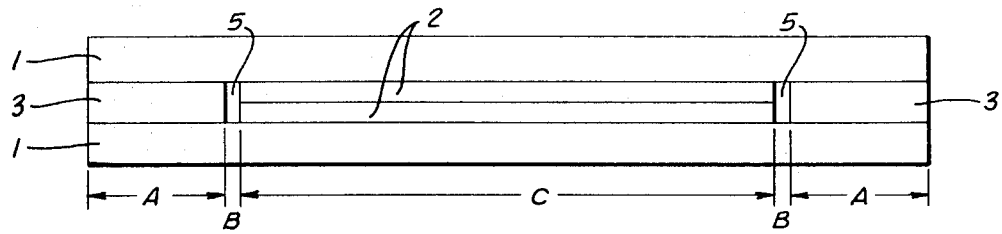
FIG_2
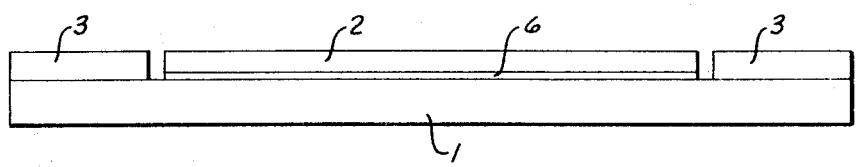
FIG_3
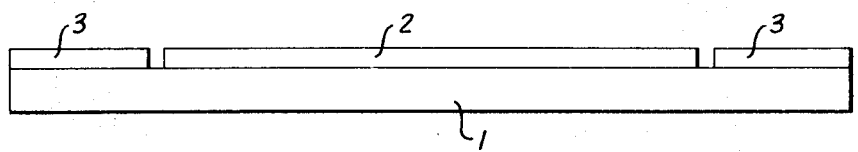
FIG_4
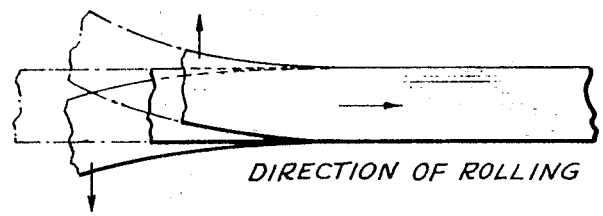
DIRECTION OF ROLLING
FIG_5
WALTER D. FINNEGAN
INVENTOR.
BY *Frank W. Hansen*
ATTORNEY Oct. 19, 1971   W. D. FINNEGAN   3,613,220
METHOD OF FORMING TRANSITION INSERT MATERIAL
Filed Nov. 25, 1969   2 Sheets-Sheet 2
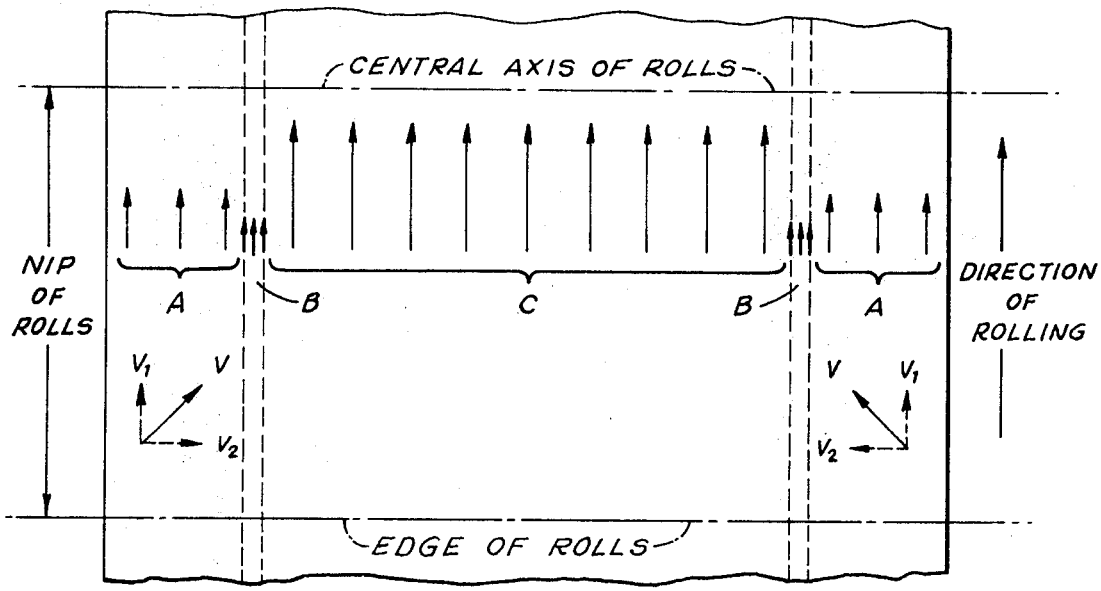
TENSILE FORCES DEVELOPED UNDER BALANCED ROLLING CONDITIONS.
FIG_6
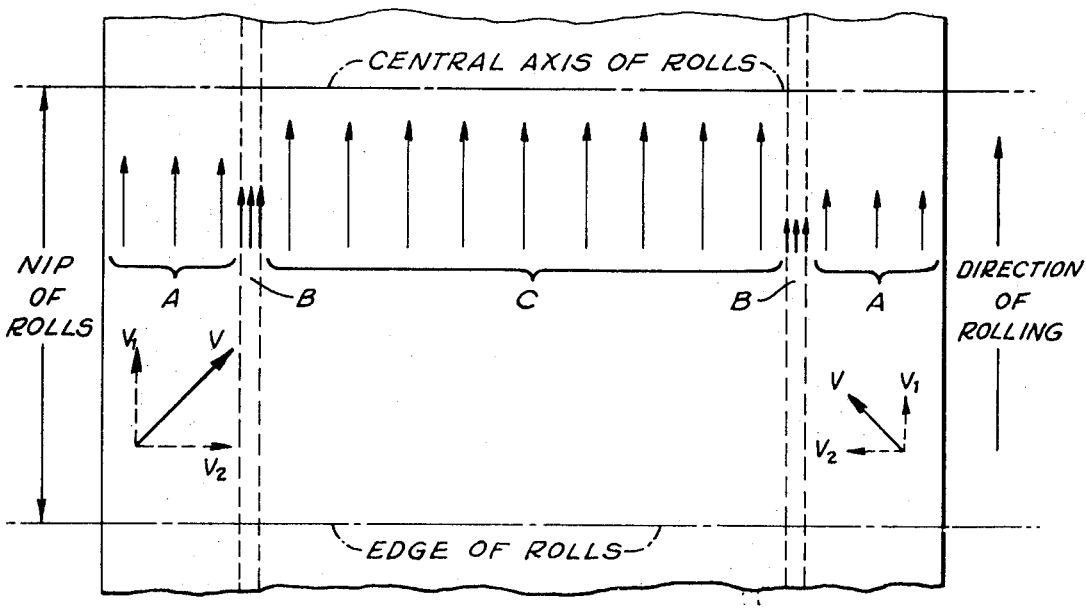
TENSILE FORCES DEVELOPED UNDER UNBALANCED ROLLING CONDITIONS.
FIG_7
WALTER D. FINNEGAN
INVENTOR.
BY Frank M Hansen
ATTORNEY United States Patent Office 3,613,220
Patented Oct. 19, 1971

3,613,220
METHOD OF FORMING TRANSITION
INSERT MATERIAL
Walter D. Finnegan, Concord, Calif., assignor to Kaiser
Aluminum & Chemical Corporation, Oakland, Calif.
Filed Nov. 25, 1969, Ser. No. 879,752
Int. Cl. B23k 31/02
U.S. Cl. 29—472.1                    8 Claims

ABSTRACT OF THE DISCLOSURE

A method for forming long lengths of trilayer and bilayer composite material for transition inserts comprising preparing a prebond pack containing at least an aluminum facing plate, a ferrous plate, and aluminum side bars, having substantially the same deformability as the facing plate, attached to face of the aluminum plate adjacent to the ferrous plate, heating the pack to a temperature between 400 and 900° F. and subjecting the pack to a one-step reduction to reduce the thickness of the aluminum materials adjacent to the ferrous element by at least 12%, preferably between 20 and 50%.

BACKGROUND OF THE INVENTION

This invention relates to a process for forming long lengths of transition insert material which is suitable for joining steel and other ferrous materials to aluminum or aluminum alloys by conventional fusion welding techniques.

It is frequently desirable in structural, cryogenic, and electrical conductor applications to connect steel and other ferrous materials to aluminum. Mechanical connections between aluminum and ferrous materials normally are not desired because of the severe crevice corrosion which is effected between these materials. The welding of ferrous materials to aluminum materials by conventional fusion welding techniques is undesirable due to the formation of intermetallic compounds such as $AlFe_3$ at the interface between the aluminum and ferrous materials, which results in a highly brittle bond between the ferrous material and the aluminum material.

To avoid the problems associated with the mechanical connecting of ferrous material to aluminum, and the welding of ferrous material to aluminum, the transition insert has been developed. This is a composite having a relatively thick ferrous material on one side and a relatively thick aluminum material on the other side. The ferrous side can be fusion welded to a ferrous member and the aluminum side can be fusion welded to an aluminum member.

The composite material itself must have sufficient strength to maintain the structural integrity between the ferrous and aluminum members which have been welded to the composite. Prior methods of forming this transition insert material such as by casting molten aluminum onto a ferrous element generally have been unsatisfactory due to the formation of large amounts of intermetallics at the interface between the ferrous element and the aluminum element, which produce the same brittle bonds as the welding of a ferrous member to an aluminum member mentioned above. It has been found, however, that by pressure bonding or pressure welding a ferrous element to an aluminum element that the intermetallic formation at the interface of these two materials is substantially eliminated. Several processes have been developed to produce such a transition insert without the formation of large amounts of intermetallic at the interface, namely, by explosion bonding and roll bonding. The pressure bonding or pressure welding of aluminum to steel creates a sound, solid phase metallurgical bond between the two materials. Although not wishing to be limited to the following explanation, it is believed that the elongation or deformation during roll bonding of the aluminum adjacent to the ferrous element fragments the oxide film on both the aluminum and ferrous elements causing intimate metal-to-metal contact and forming a sound, solid phase metallurgical bond. The bond interface is characterized by high-strength, substantially as strong as the aluminum member, and low resistivity due to the absence of the $AlFe_3$ intermetallics. With explosion bonding apparently the high velocity jet emanating from the collision region fragments and removes any oxide or surface contamination on the mating surfaces.

The prior art roll bonding techniques, which comprise merely assembling the various elements loosely into a sandwich and then passing the sandwich through rolls, are deficient in that lateral relative movement of the various elements occurs during rolling resulting in the fishtailing of the sandwich. This fishtailing severely limits the length of material that can be rolled.

The lateral excursions are caused primarily by the differential reduction of the aluminum member more along one side than along the other. This extends one side of the aluminum member longer than the other, creating a camber or lateral excursion of the aluminum member with respect to the ferrous member. The cambering of the aluminum member shifts the member with respect to the ferrous element which further aggravates the situation because that portion of the aluminum member not underlayed with the ferrous element is not substantially reduced by the rolling operation. This results in a fishtail effect which substantially reduces the percent recovery of transition insert material and severely limits the length of material that can be produced.

It is the purpose of this invention to provide an improved process for the roll bonding of long lengths of transition insert material up to 25 feet or more without the prior art problems of lateral excursions of the aluminum members.

DESCRIPTION OF THE INVENTION

The method of forming transition insert material in accordance with this invention comprises roll bonding an aluminum element and a ferrous element to produce a solid phase metallurgical bond between the two elements. In accordance with this process the mating surfaces of the elements to be bonded are cleaned, preferably with an abrasive detergent, and by sanding, and then the elements are assembled into a prebond pack assembly. The prebond packs are then heated to a temperature of at least 400° F. but below the temperature at which any alloy phase is molten. However, normally the packs need not be heated above 900° F. At the lower temperatures the difference between the hot hardness of the aluminum element adjacent the ferrous element and the ferrous element is normally of insufficient magnitude to allow adequate deformation of the aluminum element to obtain a sound, solid phase metallurgical bond. At the higher temperatures there is a tendency for a relatively thick oxide layer to form on the mating surfaces which reduces the bonding efficiency. It is preferred to roll bond the packs as soon as possible after the rolling temperature is reached, and it has been found that normally the pack should not be maintained at the roll bonding temperature for more than one hour because of the formation of the large amounts of oxide on the mating surfaces of the materials. The pack is subsequently rolled in a one-pass operation to form the solid phase bond. In order to make a bond that has a high strength over a unit area, as distinct from cladding where there is very little strength over a unit area, the aluminum element adjacent the ferrous element whether it be a bonding layer or a facing plate must be deformed by at least 12% to produce an effective bond, preferably between 20 and 50%. Even though multiple passes through the mill are contemplated, at least one pass must effect a reduction of the aluminum element adjacent to the ferrous element of at least 12%.

If the transition insert is to be employed in a strength bearing capacity normally the aluminum member must be quite strong. However, to obtain a solid bond between the aluminum and ferrous material there must be a large difference in hardness at the roll bonding temperature. With high strength aluminum alloys such as the 7000 series and 2000 series (Aluminum Association designations) the hot hardness is usually not sufficiently lower than that of the ferrous element to efficiently roll bond the two, and therefore, it is advisable to place a substantially more deformable aluminum material between the strong aluminum alloy and the ferrous element. Suitable examples of these more deformable aluminum alloys are 1100 and 3003 alloys. The soft interlayer must initially be at least 0.5 mm. thick to produce an effective metallurgical bond. If the transition insert is to be utlized in an electrical conducting capacity, such as in the anode rod assembly in aluminum reduction cells, then conductivity is the prime consideration not strength. In this instance there is usually no need for a strong aluminum alloy and thus only a highly conductive alloy such as 3003 and 1100 need be used in conjunction with the ferrous material.

The function of the transition insert as explained above is to facilitate the fusion welding of the aluminum side of the insert to an aluminum member and fusion welding the ferrous side of the insert to a ferrous member. Of necessity the thickness of the aluminum side and the ferrous side of the transition insert must be thick enough to accommodate the fusion welding to compatible materials. Generally, the thickness normal to the bonding interface between the aluminum element and the ferrous element should be at least 1 cm. after roll bonding, although the elements may be thinner if proper precautions are taken during welding to avoid the formation of intermetallics at the interface of the ferrous element and aluminum adjacent thereto.

The accompanying drawings are provided for a better understanding of the present invention. In all drawings, the corresponding portions are similarly numbered.

FIG. 1 is a perspective view of the prebond pack assembly in accordance with a preferred embodiment of the invention.

FIG. 2 is a cross-sectional view of another preferred pack assembly in accordance with the invention.

FIGS. 3 and 4 are cross-sectional views of other embodiments of the invention.

FIG. 5 is a plan view of the fishtail effects experienced by the prior art roll-bonding techniques.

FIGS. 6 and 7 are plan views of segments of the pack assembly in the nip of the rolls, showing in an idealized manner the forces developed during rolling. FIG. 6 illustrates rolling under balanced conditions and FIG. 7 unbalanced conditions.

FIGS. 1 and 2 illustrate the preferred pack construction for the present invention. The pack assembly shown in these drawings comprise two aluminum facing plates 1, two ferrous members 2, and a pair of side bars 3, the side bars being attached, preferably by welding at 4 to the underside or innerface of the overextending portion of the top aluminum facing plate and to the upperside of the bottom aluminum facing plate. A gap 5 will exist at the roll bonding temperatures employed. In FIG. 1 soft aluminum interlayers 6 are placed between the aluminum facing plates and the ferrous elements. The embodiments shown in FIGS. 1 and 2 (trilayered and bilayered respectively) are preferred because two plates of transition insert material can be made with one pass and in addition the pack is vertically balanced, that is, the pack will not curl in the vertical direction when exiting from the rolls.

Although not vertically balanced, FIGS. 3 and 4 illustrate other embodiments of the present invention.

In all the embodiments of the present invention, the side bars must be substantially as deformable as the aluminum facing plate. In addition, the side bars must have a width at least as great as their thickness, preferably greater. In addition the thicknesses of the side bars should be equal to or slightly exceed the thickness of the ferrous element, when forming the bilayered composite, and be equal to or slightly exceed the thickness of the soft interlayer and the ferrous element when forming the trilayered composite. As will be explained hereinafter, the side bars should not extend more than one-eighth of an inch beyond the edge of the aluminum facing plate nor should the aluminum facing plate extend more than one-eighth of an inch beyond the side bars. The interlayer, when used, should be substantially thinner than either the ferrous element or the strong aluminum element and in all circumstances should be thicker than 0.5 mm.

As discussed above, in the prior art methods of roll bonding transition insert material, the percent recovery was quite low, primarily due to the lateral excursions of the aluminum element with respect to the ferrous element during the roll bonding operations. These lateral excursions of the aluminum member are due to the differential elongation between the sides of the aluminum member. There are several causes for this differential elongation. For example, the aluminum facing plate may increase in thickness from edge to edge and as this is rolled, the thicker edge will tend to extend more than the thinner edge, causing the aluminum facing plate to shift relative to the ferrous element in the direction toward the thinner edge. This shift relative to the ferrous element (which normally experiences relatively little thickness reduction) causes the edge of the aluminum facing plate to extend further beyond an edge of the ferrous element. Once this occurs the excursions are accelerated because the aluminum extending beyond the edge of the ferrous element is reduced relatively little, resulting in a fishtail effect as is shown in FIG. 5. Other factors such as the steel element having an increasing thickness from one edge to the other also creates the same effect because the area of the aluminum facing plate above the thicker edge of the steel element will be extended more during rolling than the area of the facing plate over the thinner edge of the ferrous element, promoting lateral excursions and finally the fishtail effect explained above.

The inventor has found that by preparing a prebond pack shown in FIGS. 1 through 4, employing the side bar construction shown therein, these lateral excursions can be substantially eliminated and, as a result, greater lengths of transition insert material can be made. These side bars, however, do not act merely to physically restrain the relative movement between the various elements of the pack. It is believed that when roll-bonding in accordance with the various embodiments of the invention, lateral forces are created on both sides of the pack due to the tendency of the section C of the facing plate (see FIG. 2) to extend more during rolling than sections A and B of the facing plates. That is, as the pack enters the nip of the rolls, the rolling forces tend to extend section C of the facing plate more than sections A and B and the section A more than section B. However, as the pack exits from the rolls the leading or front edge of the pack will be substantially straight. It is believed that in the nip of the rolls the extension of section C of the facing plate extends section B. Likewise, the extension of section A also contributes to the extension of section B but only to the length of A. In addition, the extension of section C must act through section B to extend section A to substantially the same length as section C. It should be noted that the thickness of section B is not reduced by the normal rolling mechanisms but instead by the elongation of the section by sections A and C. The tensile forces in sections A, B and C (as schematically shown in FIG. 6) created during the rolling operation due to the extension of these sections result in force vectors V having components $V_1$ in the direction of rolling and components $V_2$ in the direction transverse to that of the rolling. These force vectors exist only in the nip of the roll. Under balanced rolling conditions, i.e., under conditions which do not tend to cause lateral excursions of the aluminum facing plate relative to the ferrous element, the force vectors on both sides of the pack will be equal in magnitude (see FIG. 6). However, in the practical case unbalanced forces prevail (see FIG. 7), in which case the pack construction of the present invention creates self-balancing conditions as will be desrcibed. If, for example, the aluminum facing plate entering the rolls has a variable thickness increasing from left to right, the thicker part of the facing plate over the ferrous element will have a tendency to extend more than the thinner portions of the facing plate over the ferrous element. As mentioned above, this would tend to move the facing plate relative to the ferrous element in the direction of the thinner edge of the facing plate. This tends to increase the gap between the side bar and the ferrous element on the left-hand side of the pack. This increased gap increases the tensile force differential between sections C and B because section B is reduced in thickness (and extended) very little in comparison with section C, thus increasing the force vector on the left-hand side. This relative movement also reduces the gap on the right-hand side thus reducing the force vector on the right-hand side. The differential between the force vector on the left-hand side and the force vector on the right-hand side creates a bending moment in the nip of the rolls which moves the aluminum facing plate and the side bars to the right, thus compensating for the tendency of this material to move to the left. Several factors influence the magnitude of the force vectors. For example, increased thickness reduction, lower temperatures and stronger aluminum alloys tend to increase the magnitude of the resultant force vectors. It was found that when roll bonding a strong aluminum alloy (7039) to a steel element at relatively low temperatures, the transverse components of the force vectors were of sufficient magnitude to bow the 7039 facing plate as it entered the nip of the roll. In some instances, for example, when the gap is too large, the temperature is extremely low or the aluminum facing plate has an extremely high hot hardness, the differential between the tensile forces in the longitudinal direction between section C and section B of the facing plate is sufficient to shear the aluminum facing plate along the edge of the ferrous element. This tendency to shear can be minimized by increasing the thickness of the side bar elements in amounts up to 10% of the thickness of the ferrous element if the bilayered is to be made and up to 10% of the thicknesses of the ferrous element and the soft interlayer if the trilayer is to be made.

The gap or spacing between the side bars and the ferrous element at roll bonding temperatures may range from a minimum of about 0.05 inch to a maximum of about 0.5 inch. A minimum of 0.05 inch is necessary to allow for the compensating movements and to allow sufficient resultant force vectors to develop to maintain the self-balancing aspects of the pack. With a gap much above 0.5 inch the longitudinal tensile forces are of such a high magnitude so as to cause the shearing of the facing plate in the area of the edge of the ferrous element.

When assembling the prebond pack up to a width of about 120 inches, the side bars need only be placed against the side of the ferrous element and then welded to the aluminum alloy facing plates. When the pack is heated to roll bonding temperatures, the differential thermal expansion between the ferrous element and the aluminum facing plate is sufficient to form a gap up to about 0.30 inch.

If the edges of the side bar extend more than one-eighth inch beyond the edges of the facing plate or vice versa, the differential of the longitudinal tensile forces between the edges of the facing plate and the side bars created during rolling (due to the extending portions not being reduced) are of sufficient magnitude to break the welds connecting the side bar and the facing plate. Once the welds are broken all edge control is lost and fishtailing results.

Generally, the composition of the various elements does not effect the roll bonding process only insofar as the composition affects the hot hardness of these materials, Thus, a wide range of aluminum alloys and ferous materials can be utilized within the process of this invention. The end use of the transition insert, however, may place some composition limits on the various members. For example, the aluminum facing plate, to be effectively fusion welded by conventional procedures, normally would have less than 0.30% copper, and as a result, a high copper containing aluminum alloy will normally not be used as a facing plate. Nevertheless, it is within the scope of the present invention to produce a transition insert having an aluminum facing plate with large amounts of copper. For example, a facing plate of 7075 alloy or 2024 alloy could be used and then a mechanical connection could be made between the aluminum side of the transition insert and an aluminum member.

The critical factor in forming the trilayered composite is the deformability of the soft interlayer with respect to both the ferrous element and the aluminum facing plate at roll bonding temperatures. Suitable interlayers are 1100 and 3003 alloys (Aluminum Association of America designations) although the composition need not be so limited. It should be noted that the difficulties involved in obtaining a sound bond with the trilayered product are not between the soft interlayer and the ferrous element but between the aluminum facing plate and the interlayer, because at the higher temperatures the difference in deformability between the interlayer and the aluminum facing plate may be slight. That is, the unbonded areas in the transition insert material will lie between the two aluminum elements rather than the ferrous element and the interlayer. Generally, no problems are experienced when roll bonding the bilayered composite because of the large differential of hot hardness between the aluminum member and ferrous member at the roll bonding temperatures.

It has been found that when roll bonding carbon steels, particularly the low carbon steels at the higher temperatures, i.e., above 600° F., the steel members have a tendency to produce large amounts of oxide on the surface which severely limits the amount of oxide on between the carbon steel element and the aluminum element. However, at the lower temperatures it becomes difficult to reduce the thickness of the aluminum element without also reducing the thickness of the steel element by considerable amounts. As mentioned above, to obtain a solid phase metallurgical bond there must be a considerable difference in deformability between the various elements at the roll bonding temperatures. Thus, it has been found that with carbon steels, particularly low carbon steels, a soft interlayer should be used, preferably an aluminum alloy containing more than 99.0% aluminum such as the 1100 alloy. The temperature should range between 400 and 550° F., preferably between 450° and 500° F. It may be desirable to employ a carbon steel element clad with stainless steel to avoid the oxidation problems associated with the carbon steels. In this case the stainless steel face would contact the aluminum element. When roll bonding stainless steels to aluminum the bonding temperature is preferably maintained above 600° F. but below the melting point of the alloy component, that is, normally below 900° F. Suitable ferrous elements include, but are not limited to stainless steels, high carbon steels, and the like. At the temperature and with the amount of reduction involved in the present invention, the ferrous members have no tendency to bond together during rolling.

TABLE

| Example No. | Condition | Facing plates, in.[1] | | | Interlayer, in.[2] | | | Core plates, in.[3] | | | Pre-rolling temp., °F. | Rolling temp., °F. | Percent reduction of layer adjacent ferrous element |
|---|---|---|---|---|---|---|---|---|---|---|---|---|---|
| | | L | W | Th. | L | W | Th. | L | W | Th. | | | |
| 1 | Initial | 148 | 40 | 0.625 | 144 | 36 | 0.128 | 144 | 36 | 0.25 | 850 | 700 | 20 |
| | After rolling | 182 | 40 | 0.49 | N.D. | 36 | 0.10 | 159 | 36 | 0.24 | | | |
| 2 | Initial | 148 | 40 | 0.625 | 144 | 36 | 0.128 | 144 | 36 | 0.25 | 850 | 700 | 36 |
| | After rolling | 202 | 40 | 0.44 | N.D. | 36 | 0.08 | 175 | 36 | 0.21 | | | |
| 3 | Initial | 148 | 40 | 0.625 | 144 | 36 | 0.125 | 144 | 36 | 0.25 | 850 | 650 | 30 |
| | After rolling | 204 | 40 | 0.40 | N.D. | 36 | 0.085 | 188 | 36 | 0.21 | | | |
| 4 | Initial | 148 | 40 | 0.83 | 144 | 36 | 0.125 | 144 | 36 | 0.25 | 850 | 750 | 43 |
| | After rolling | 236 | 40 | 0.52 | N.D. | 36 | 0.07 | 187 | 36 | 0.19 | | | |
| 5 | Initial | 144 | 40 | 0.75 | | | | 140 | 36 | 0.25 | 850 | 775 | 20 |
| | After rolling | 181 | 40 | 0.60 | | | | 156 | 36 | 0.24 | | | |
| 6 | Initial | 148 | 40 | 0.75 | | | | 144 | 36 | 0.375 | 800 | 670 | 25 |
| | After rolling | 199.5 | 40 | 0.56 | | | | 175 | 36 | 0.32 | | | |
| 7 | Initial | 148 | 40 | 0.75 | | | | 144 | 36 | 0.375 | 800 | 705 | 27 |
| | After rolling | 192 | 40 | 0.55 | | | | 168 | 36 | 0.35 | | | |
| 8 | Initial | 148 | 40 | 0.75 | | | | 144 | 36 | 0.375 | 800 | 760 | 23 |
| | After rolling | 191 | 40 | 0.58 | | | | 169.5 | 36 | 0.32 | | | |

[1] The aluminum facing plates of Examples 1 through 4 were 7039 alloy and the facing plates of Examples 5 through 8 were 3003.
[2] The aluminum interlayer was 1100 alloy.
[3] Core plates were 304 stainless steel.

The table illustrates specific examples of several embodiments of the present invention. The Examples 1 through 4 illustrate the embodiment set forth in FIG. 1 and Examples 5 through 8 illustrates the embodiment set forth in FIG. 2. In each example, the mating surfaces of the various elements were first cleaned with an abrasive detergent and sanded to prepare for the roll bonding. The pack was assembled by arranging the aluminum plate and steel plate so as to center the steel with respect to the aluminum facing plate and in Examples 1 through 4 to align the interlayer with the steel element. The side bars, which were of the same composition as the aluminum facing plate, were placed adjacent to the steel element between the two aluminum facing plates and then welded to the facing plates employing standard GMA practice at a distance of about every two feet along the length of the pack. To facilitate easier handling bar elements were welded to the leading and trailing edges of the pack. The packs were then heated to the indicated temperatures and then roll bonded. The difference between the initial temperature and the actual temperature of roll bonding is due to the hold-up prior to the rolling operation. In all of the examples, the percent recovery was high except for Example 3 but even this example had considerable higher recovery than prior art methods. In Example 3, which employed a relatively high-strength aluminum facing plate and roll bonded at a relatively low temperature, the facing plate sheared along the edge of the steel element in the last half of the pack in the nip of the rolls and once the side bars were sheared from the remainder of the pack, all edge control was lost and fishtailing resulted. After roll bonding, the packs were stretched for leveling and the edges were cropped to remove the side bars and the unbonded portions along the edge of the steel element. The two plates of transition insert material are then separated and cut up to the desired transition insert shape.

Although the invention has been described in terms of making transition insert material, it is obvious that the present invention can be employed to metallurgically bond aluminum to ferrous material, notwithstanding the end use of the composite material. Moreover, this invention is directed primarily to forming relatively thick composite material, i.e., greater than 0.5 inch in thickness.

What is claimed is:

1. A method for producing relatively thick composite material which comprises:
   (A) selecting a separate ferrous plate element, a separate aluminum alloy element, a separate bond element and at least two aluminum side bar elements, the bond element characterized by being:
      (i) primarily aluminum in composition,
      (ii) substantially more plastically deformable than either the ferrous element or the aluminum alloy element at bonding temperature,
      (iii) at least 0.5 mm. thick,
      (iv) thinner than either the ferrous element or the aluminum alloy element and substantially as wide as the ferrous element,
   the aluminum alloy element characterized by being substantially as wide as the combined width of the ferrous element and the aluminum side bar elements, the aluminum side bar elements characterized by being substantially as deformable as the aluminum alloy element having widths at least equal to their thicknesses, and having thicknesses at least substantially equal to the combined thicknesses of the ferrous element and the bonding element,
   (B) cleaning the mating surfaces of said elements,
   (C) preparing a prebond pack assembly by placing the bonding element between the ferrous element and the aluminum alloy element, the aluminum alloy element extending beyond the edges of the ferrous element and bonding element by substantially at least the width of said side bar elements, attaching the side bar elements to the extending portion of the aluminum alloy element adjacent to the ferrous element in such a fashion that at the bonding temperature a gap between about 0.05 and 0.50 inch exists between each side bar element and the ferrous element,
   (D) heating the prebond assembly to a temperature between 450° F. and 900° F. and
   (E) subjecting the assembly to a single stage thickness reduction by rolling wherein the bond element is reduced at least 12% in thickness to produce transition insert material having a ferrous side and an aluminum alloy side which are thick enough to accommodate fusion welding.

2. The process in accordance with claim 1 wherein the bond element is reduced between 20 and 50% in thickness.

3. A method for producing a relatively thick composite material which comprises:
   (A) selecting two separate ferrous plate elements, two separate aluminum alloy plate elements, two separate bond elements and at least two aluminum side bar elements, the bond elements characterized by being
      (i) primarily aluminum in composition,
      (ii) substantially more plastically deformable than either the ferrous element or the aluminum alloy elements at bonding temperature,
      (iii) at least 0.5 mm. thick,
      (iv) thinner than either the ferrous element or the aluminum alloy element and substantially as wide as the ferrous element,
   the aluminum alloy elements characterized by being substantially as wide as the combined widths of the ferrous elements and the aluminum side bar elements, the aluminum side bar elements characterized by being substantially as deformable as the aluminum alloy elements having widths at least equal to their thickness, and having thicknesses at least substantially equal to the combined thicknesses of the ferrous elements and the bonding elements, (B) cleaning the mating surfaces of the said elements, (C) preparing a prebond pack assembly comprising a laminar core element of the two ferrous elements in superimposed and aligned relationship, the aluminum alloy elements on opposite faces of said core, the sides of the aluminum alloy elements extending substantially equivalent amounts beyond the edge of the core element, the bonding elements interposed between the core element and the aluminum alloy elements and in substantially longitudinal and transverse alignment with the core, and the side bar elements attached to the extended inner facing of the aluminum alloy elements in such a fashion that at bonding temperature a gap between 0.05 and 0.5 inch exists between each side bar element and the core element, (D) heating the prebond assembly at a temperature between about 450° F. and 900° F. and (E) subjecting the assembly to a single stage thickness reduction by rolling wherein the bond elements are each reduced at least 12% in thickness to produce transition insert material having a ferrous side and an aluminum side thick enough to accommodate fusion welding.

4. The process in accordance with claim 3 wherein the bond elements are reduced between 20 and 50% in thickness.

5. A method for producing a relatively thick composite material which comprises:

(A) selecting a separate ferrous plate element, a separate aluminum plate element and two aluminum side bar elements, the aluminum alloy plate element characterized by being
  (i) primarily aluminum in composition,
  (ii) substantially more plastically deformable than the ferrous element at bonding temperature,
  (iii) substantially as wide as the combined width of the ferrous element and the aluminum side bar elements,
the aluminum side bar elements characterized by being substantially as deformable as the aluminum plate element, having a width at least equal to their thickness and having a thickness at least substantially equal to the combined thicknesses of the ferrous element and the bonding element, (B) cleaning the mating surfaces of said elements, (C) preparing a prebond pack assembly comprising the aluminum alloy plate in substantially longitudinal and transverse alignment with the ferrous plate element, the edges of the aluminum plate element extending substantially equivalent amounts beyond the edge of the ferrous element and the sidebars attached to the face of the extending portion of the aluminum plate element adjacent the ferrous element in such a fashion that at the bonding temperature a gap between 0.05 and 0.5 inch exists between each sidebar element and the ferrous plate element.

(D) heating the prebond pack assembly to a temperature between about 450 and 900° F. and, (E) subjecting the assembly to a single stage thickness reduction by rolling wherein the aluminum plate element is reduced at least 12% in thickness to produce transition insert material having a ferrous side and an aluminum side thick enough to accommodate fusion welding.

6. The process in accordance with claim 5 wherein the aluminum plate element is reduced between 20 and 50% in thickness.

7. A method for producing a relatively thick composite material which comprises:

(A) selecting two separate ferrous plate elements, two separate aluminum plate elements and two aluminum sidebar elements, the aluminum plate elements characterized by being,
  (i) primarily aluminum in composition,
  (ii) substantially more plastically deformable than the ferrous elements at bonding temperature,
  (iii) substantially as wide as the combined width of the ferrous plate elements and the aluminum sidebar elements,
the sidebar elements characterized by being substantially as deformable as the aluminum alloy element, having widths at least equal to their thickness and having thicknesses at least substantially equal to the combined thicknesses of the ferrous elements, (B) cleaning the mating surfaces of said elements, (C) preparing a prebond pack assembly comprising a laminar core element of the two ferrous plate elements, the aluminum alloy plate elements on the opposite faces of said core, the sides of the aluminum plate elements extending substantially equivalent amounts beyond the edge of the core and the sidebar elements attached to the inner facings of the aluminum plate element in such a fashion that at bonding temperature a gap between 0.05 and 0.50 inch exists between each sidebar element and the core element, (D) heating the prebond pack assembly to a temperature between about 450° and 900° F. and (E) subjecting the assembly to a single stage thickness reduction by rolling wherein the aluminum plate elements are reduced at least 12% in thickness to produce transition insert material having a ferrous side and an aluminum side thick enough to accommodate fusion welding.

8. The process in accordance with claim 7 wherein the aluminum plate elements are reduced between 20 and 50% in thickness.

References Cited

UNITED STATES PATENTS

| | | | |
|---|---|---|---|
| 2,438,759 | 3/1948 | Liebowitz | 29—472.3 |
| 2,645,842 | 7/1953 | Orr | 29—19 |
| 2,813,332 | 11/1957 | Keay Jr. | 29—497.5 X |
| 2,985,945 | 5/1961 | Nordheim et al. | 29—19 |
| 3,066,384 | 12/1962 | Heger | 29—19 |
| 3,269,004 | 8/1966 | Smith, Jr. et al. | 29—471.1 |

JOHN F. CAMPBELL, Primary Examiner

R. B. LAZARUS, Assistant Examiner

U.S. Cl. X.R.

29—472.3, 497.5